(12) United States Patent
Hughes

(10) Patent No.: US 7,484,809 B2
(45) Date of Patent: Feb. 3, 2009

(54) ADJUSTABLE ARM REST

(76) Inventor: Sheronn J. Hughes, P.O. Box 1591, Hollywood, CA (US) 90078

( * ) Notice: Subject to any disclaimer, the term of this patent is extended or adjusted under 35 U.S.C. 154(b) by 0 days.

(21) Appl. No.: 11/685,362

(22) Filed: Mar. 13, 2007

(65) Prior Publication Data

US 2008/0224498 A1    Sep. 18, 2008

(51) Int. Cl.
*B60N 2/46* (2006.01)
*B60J 9/00* (2006.01)
(52) U.S. Cl. .................. 297/411.22; 296/153
(58) Field of Classification Search .......... 297/411.2, 297/411.21, 411.22, 411.23, 411.45, 411.36, 297/452.41, 227, 411.25; 296/153; 248/118.3, 248/118
See application file for complete search history.

(56) References Cited

U.S. PATENT DOCUMENTS 2,584,732 A * 2/1952 Okun ................. 297/411.25
2,697,479 A * 12/1954 Fesler ................. 297/411.25
2,720,912 A * 10/1955 Light ................. 297/411.25
3,147,035 A    9/1964 Lichtig
3,603,637 A * 9/1971 DePinto ................. 296/153
4,592,584 A * 6/1986 White, Jr. ................. 296/153
4,788,969 A * 12/1988 Thompson ................. 606/237
4,890,878 A * 1/1990 Harary et al. ................. 296/153
5,004,292 A    4/1991 Horne
5,205,606 A    4/1993 Cassese
5,320,401 A    6/1994 Ott
5,722,713 A    3/1998 Santa Cruz
D419,130 S    1/2000 Dyment
6,938,862 B2 * 9/2005 Orona ................. 248/118

* cited by examiner

*Primary Examiner*—Milton Nelson, Jr.
(74) *Attorney, Agent, or Firm*—Pleger Law Offices PC

(57) ABSTRACT

An adjustable vehicle arm rest comprising a body; a spring-biased adjustable arm rest slidably engaging the body; and a flexible attachment portion coupled to the body and adapted to securely engage a vehicle door through tooth-like grips. Alternatively, covers can be adapted to removably fit over the arm rest or, the arm rest can be filled with a fluid for flexible padding.

3 Claims, 6 Drawing Sheets

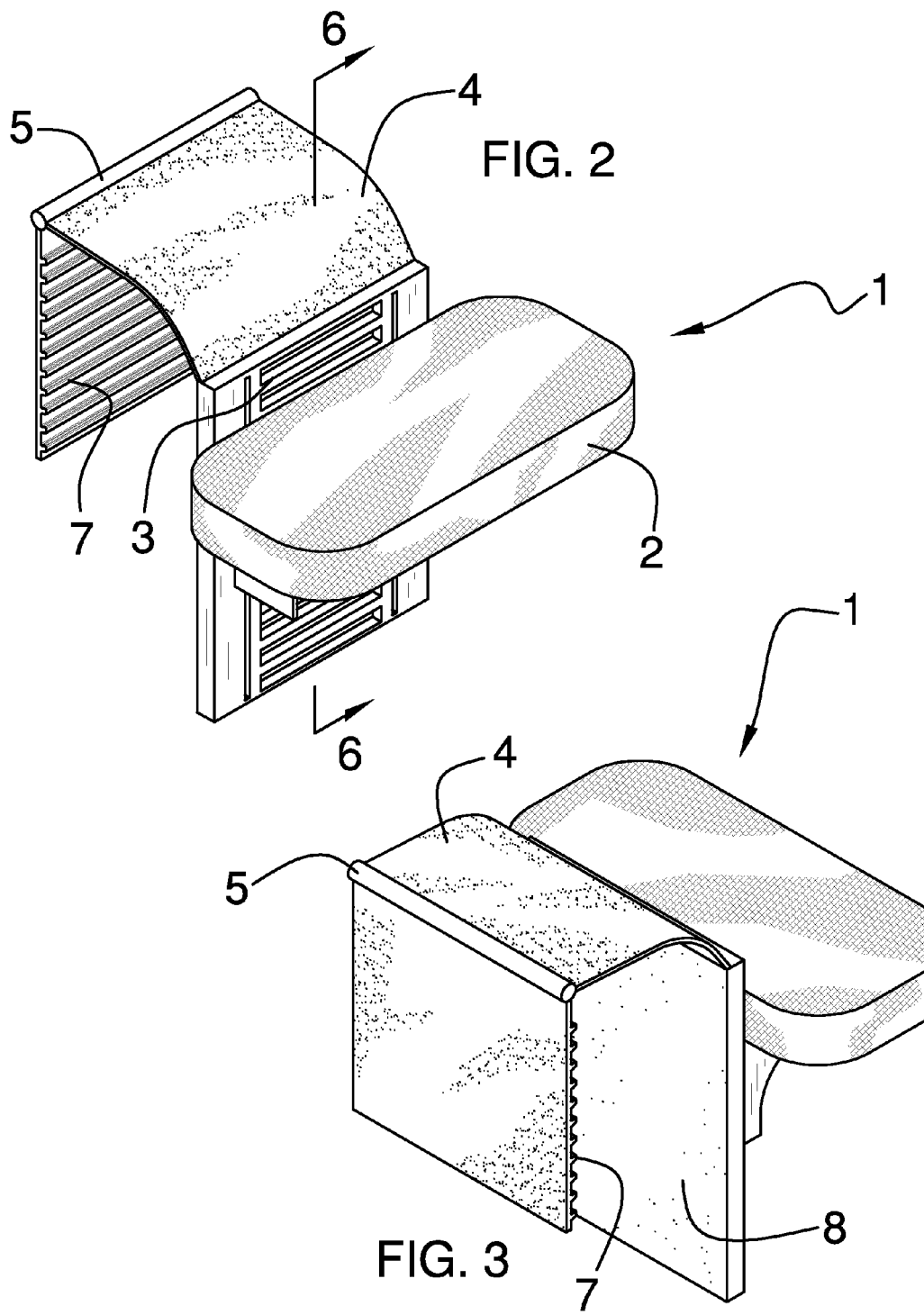

ADJUSTABLE ARM REST

BACKGROUND OF THE INVENTION

1. Field of the Invention

The present invention relates to an arm rest. More particularly, the present invention comprises a portable adjustable arm rest for use in a vehicle.

2. Description of Related Prior Art

Vehicles of all types are made according to a one-size fits all concept. Although certain features of a vehicle are capable of assisting in making a vehicle more ergonomic, this is not always the case for arm rests that might not be able to properly adjust for the arm of a vehicle passenger or driver.

There are currently devices available for various types of after-market arm rests although their adjustment mechanisms are problematic because of slippage, and they also do not always remain stationary when attached to a vehicle door. Further, once you purchase an after-market arm rest, the color and design cannot change. Additionally, current arm rests are uncomfortable and do not conform to an arm.

Therefore, it is desirable to have a new and improved arm rest with a more reliable adjusting mechanism, a comfortable pad, a non-slip gripping attachment for securing to a vehicle door, and can be accessorized to conform to any number of designs.

SUMMARY OF THE INVENTION

Accordingly it is an object of the present invention to provide a spring biased adjustable vehicle armrest capable of securing to a vehicle door.

BRIEF DESCRIPTION OF THE DRAWINGS

FIG. 2 is an elevated perspective view of a proximal side of an adjustable arm rest on a slidable track.

FIG. 3 is an elevated perspective view of a distal side of an adjustable arm rest with a serrated grip.

DETAILED DESCRIPTION OF THE DRAWINGS AND PREFERRED EMBODIMENTS

A complete understanding of this invention can be gained through reference to the drawings in conjunction with a thorough review of the disclosure herein.

Figure 1:
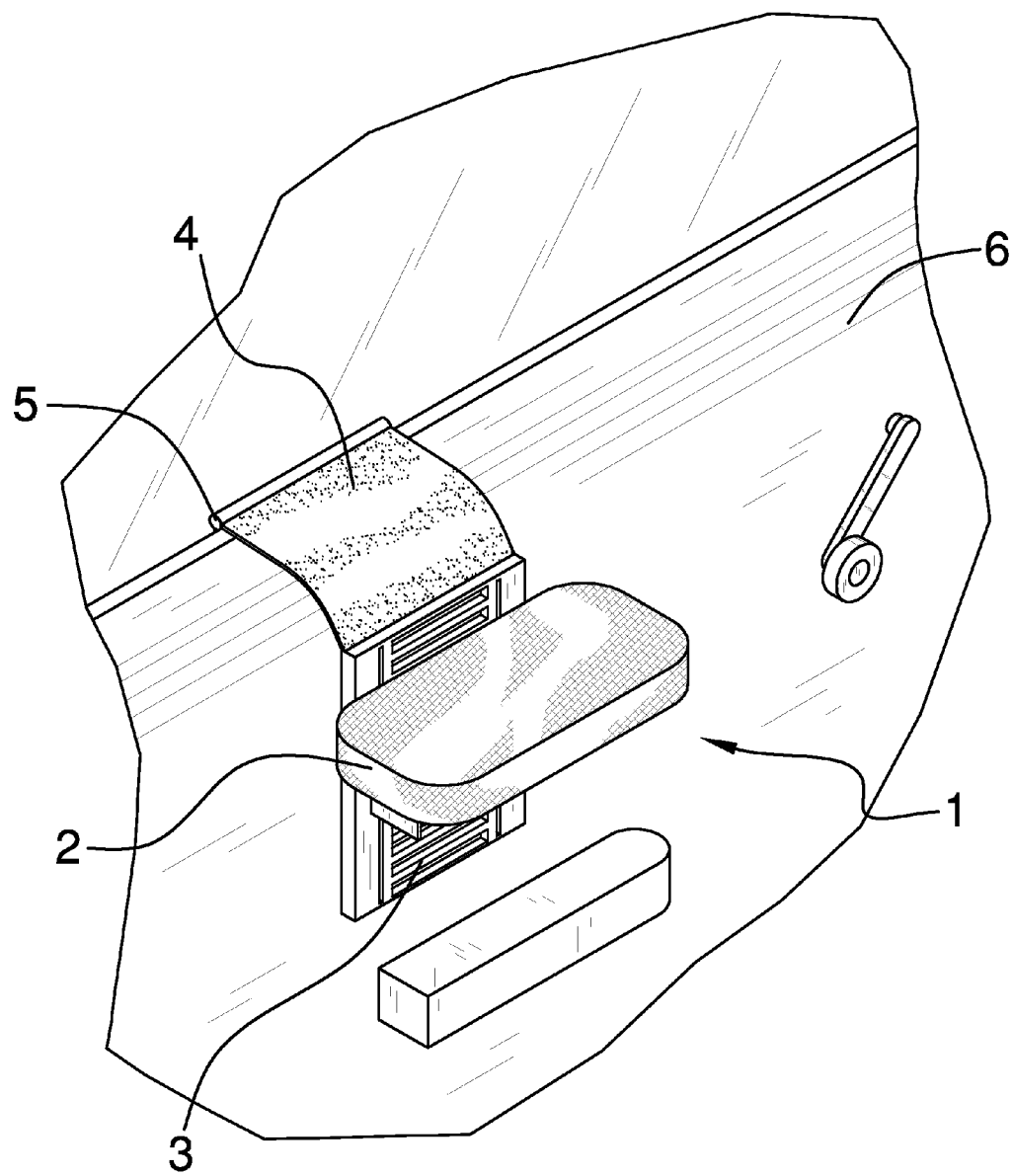
FIG. 1 is an elevated perspective view of an adjustable arm rest secured to a vehicle door panel.

FIG. 1 is illustrative of a preferred embodiment of an arm rest 1 having a vertically slidable track 3 for adjusting a cushioned pad 2 on a support base 11. (FIG. 4) To secure the arm rest 1 and allow a passenger or driver to rest their arm on the pad 2 the arm rest has a flexible grip 4 that slides between a door panel 10 and window of a standard automobile door 6.

Figure 6:
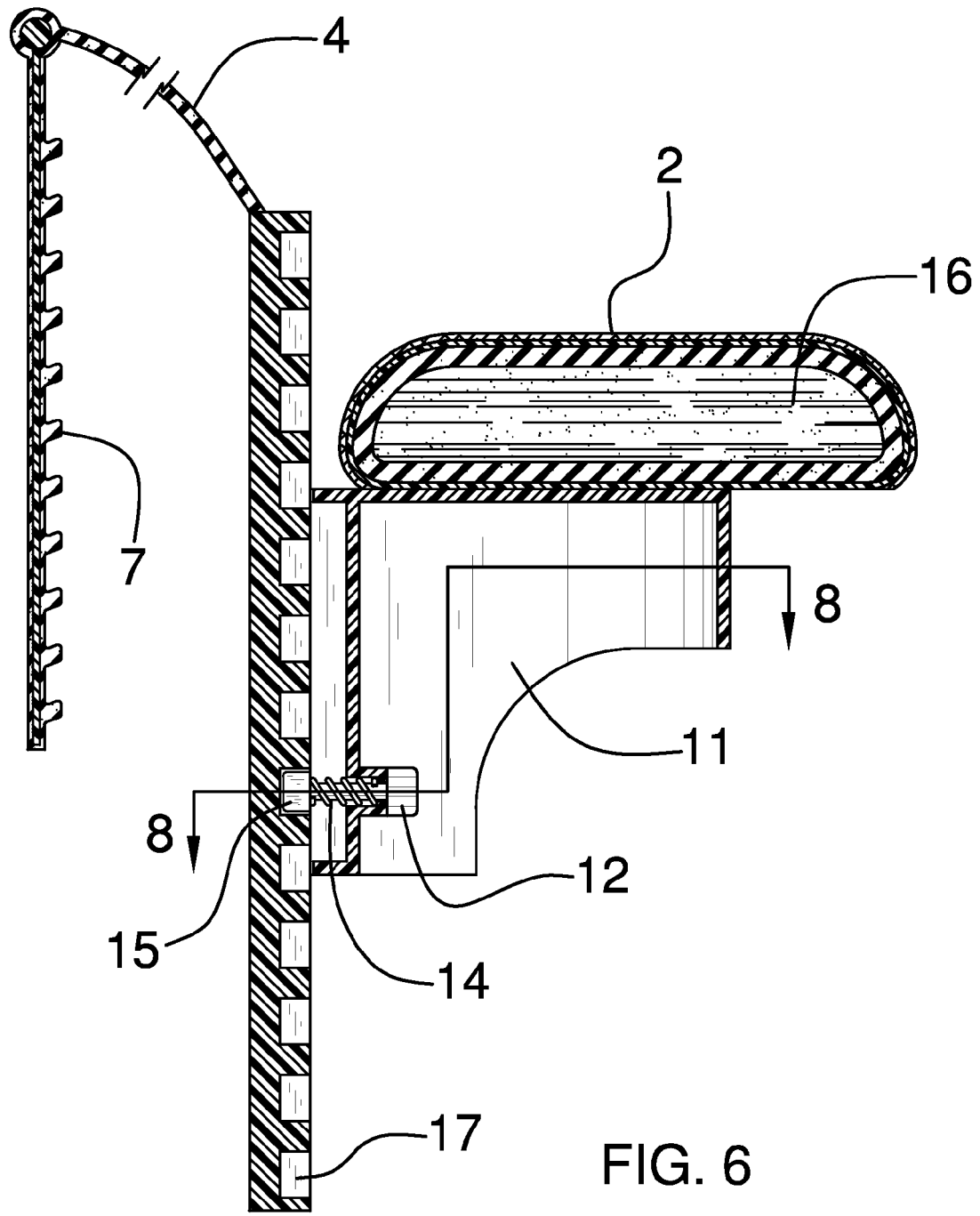
FIG. 6 illustrates vertical movement through Line 8 of a side cross-sectional view of an adjustable arm rest having a track with a spring-loaded lever coupled to a flexible grip with serrated teeth.

Although there are various types of pads commonly found in arm rests—whether adjustable or fixed—an exemplary embodiment disclosed herein provides for extra comfort through a pad that is fluid filled or filled with an elastic or extensible material (e.g., beads) to conform to the arm or elbow of a vehicle passenger. FIG. 6 shows how a pad 2 can be either padded with a cushion 16 or can be internally replaced with an appropriate fluid, such as silicon or other gel. Further, the pad 2 can be lined with durable materials such as a sturdy fabric or vinyl to withstand the external pressure from an arm creating constant friction against both the external and internal materials holding the fluid.

Figure 8:
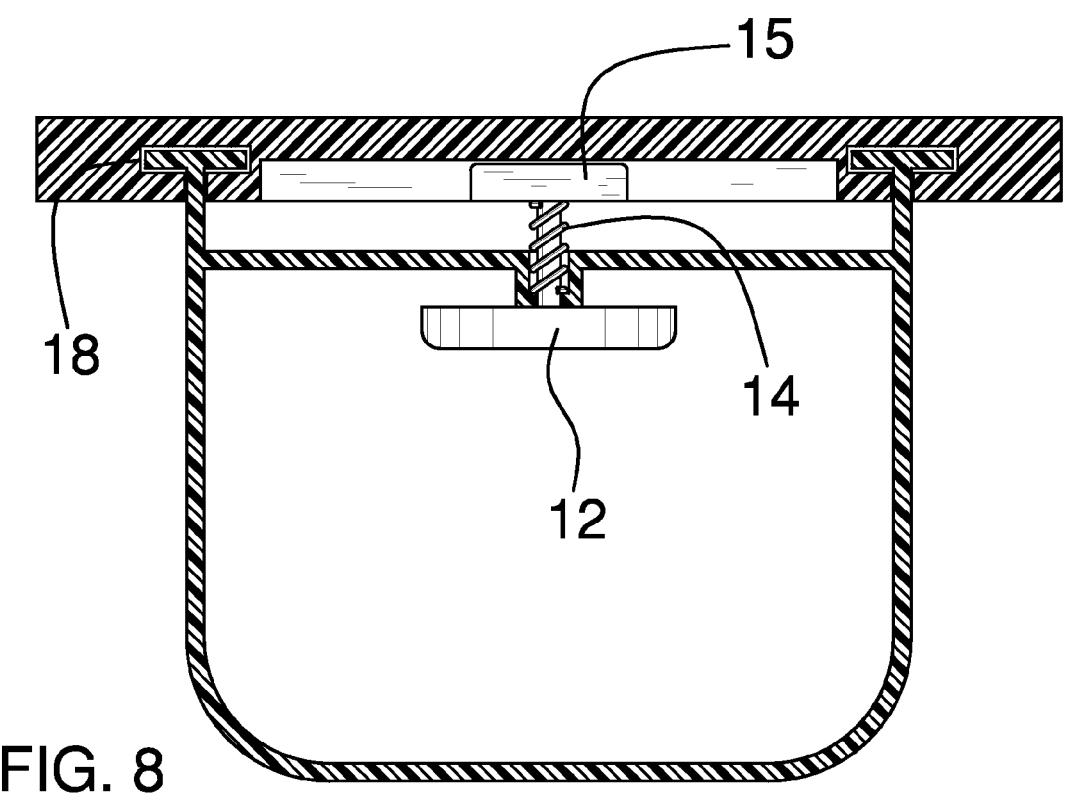
FIG. 8 is a top cross-sectional view of a spring biased lever biased against inside an aperture on a track on an arm rest.

Supporting pad 2 is support base 11 on which pad 2 can be is attached using known attachments such as glues, nails, screws, pressure fits, or other similar devices. Preferably, support base 11 slidably attaches to body 8 having track 3 on face of body 8 proximal to the interior of a vehicle. FIG. 8 shows an exemplary embodiment of how base 11 attaches to body 8 through the use of rails 18 adapted to fit into recessed rail channels 20. To prevent base 11 from sliding out of the bottom of channels 20, channels 20 can have either fixed or removable stoppers to prevent support base 11 from sliding off body 8. Likewise top of each channel 20 can also have fixed or removable stoppers so as to allow for cleaning or temporary removal of the base 11.

Adjustments to support base 11 can be accomplished by providing spring lever 12 that can be biased against a plurality of aligned apertures 17 (slots, notched ridges, and etc) on a track 3 attached to body 8 of the arm rest 1. Apertures 17 can be of any number such as are desirable for adjustment to rest 1. Furthermore, track 7 can be either an integral element of the body 8 through a single mold process or a separate element fixedly or removably attached to body 8. Attachment mechanisms for removably attaching track 7 comprise screws, pressure fits, clasps, clamps, or other similar devices.

Figure 7:
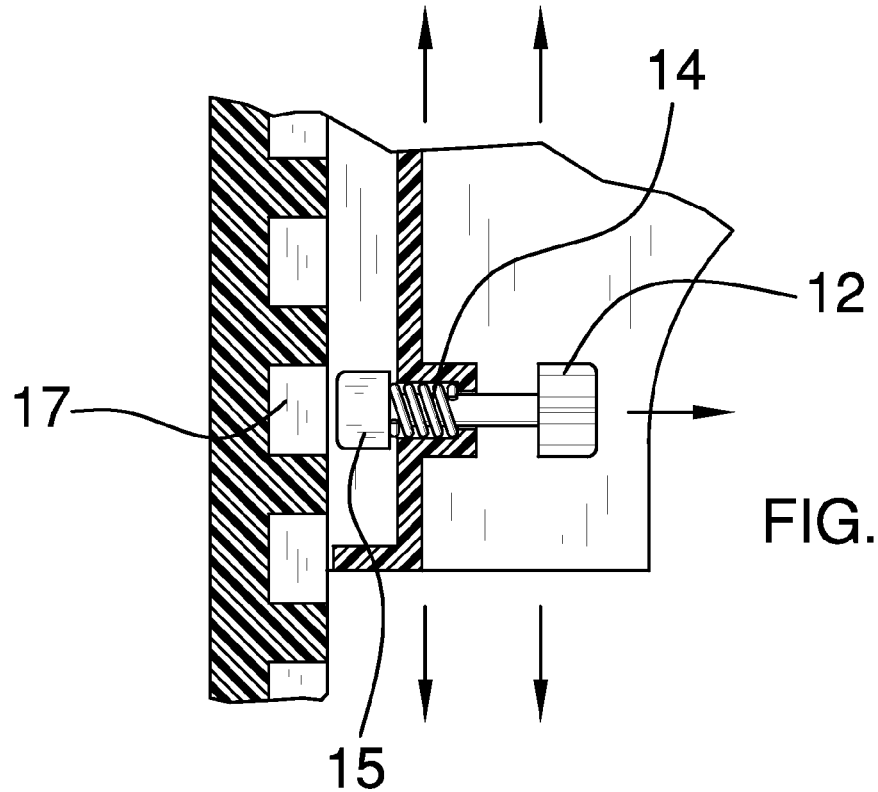
FIG. 7 is a detailed side cross-sectional view of a spring biased lever in a coiled and unlocked position relative to a track on an arm rest.

Preferably, lever 12 is comprised of lever handle 22, post 21, spring 14 and lever base 15. (FIGS. 7 and 8) Lever base 15 is sized small enough to be disposed into apertures 17 on track 3. To secure lever 12 to base 11, a molded lever support 23 is formed to allow post 21 and lever base 15 to slide relative to lever support 23 but small enough to prevent spring 14 (wrapped around post 21) from being slidable, thereby preventing lever 12 from being pulled from base 11 when the lever 12 is pulled outward from base 11 and allowing it to slide vertically.

Tension is created when lever 12 is pulled outward by preventing spring 14 from extending and biasing against lever support 23. The entire base 11 cannot move when lever base 15 is recessed within track apertures 17. When post 21 and base 15 are slid outward from the apertures 17, base 11 can be moved vertically so that lever 12 is aligned with another aperture 17. Once aligned, the tension created by spring 14 biased against the lever support 23 will cause base 15 and post 21 to be inserted into aligned aperture 17.

Figure 4:
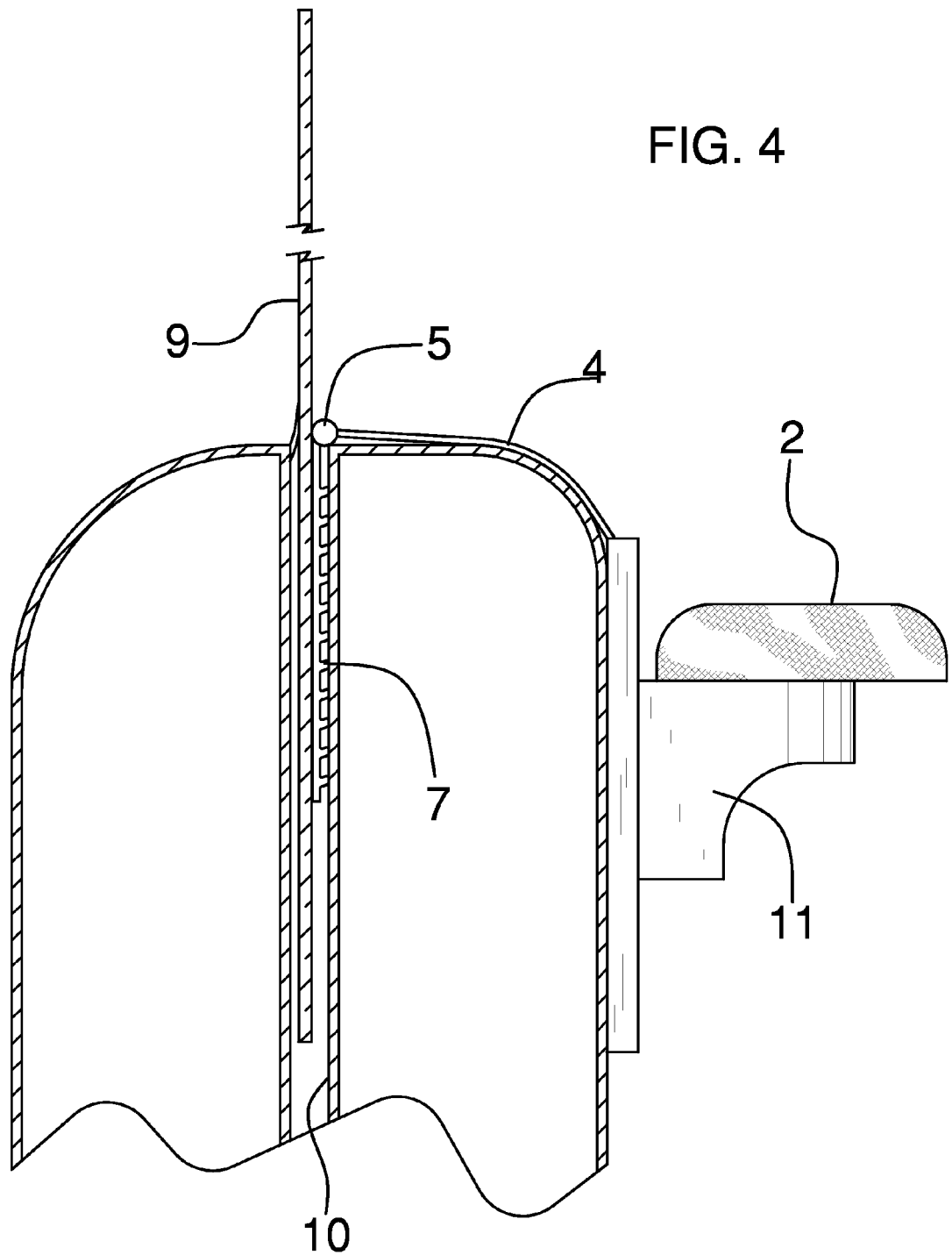
FIG. 4 is a side cross-sectional view of an adjustable arm rest with a flexible grip situated between a window and a panel of a vehicle door.
Figure 5:
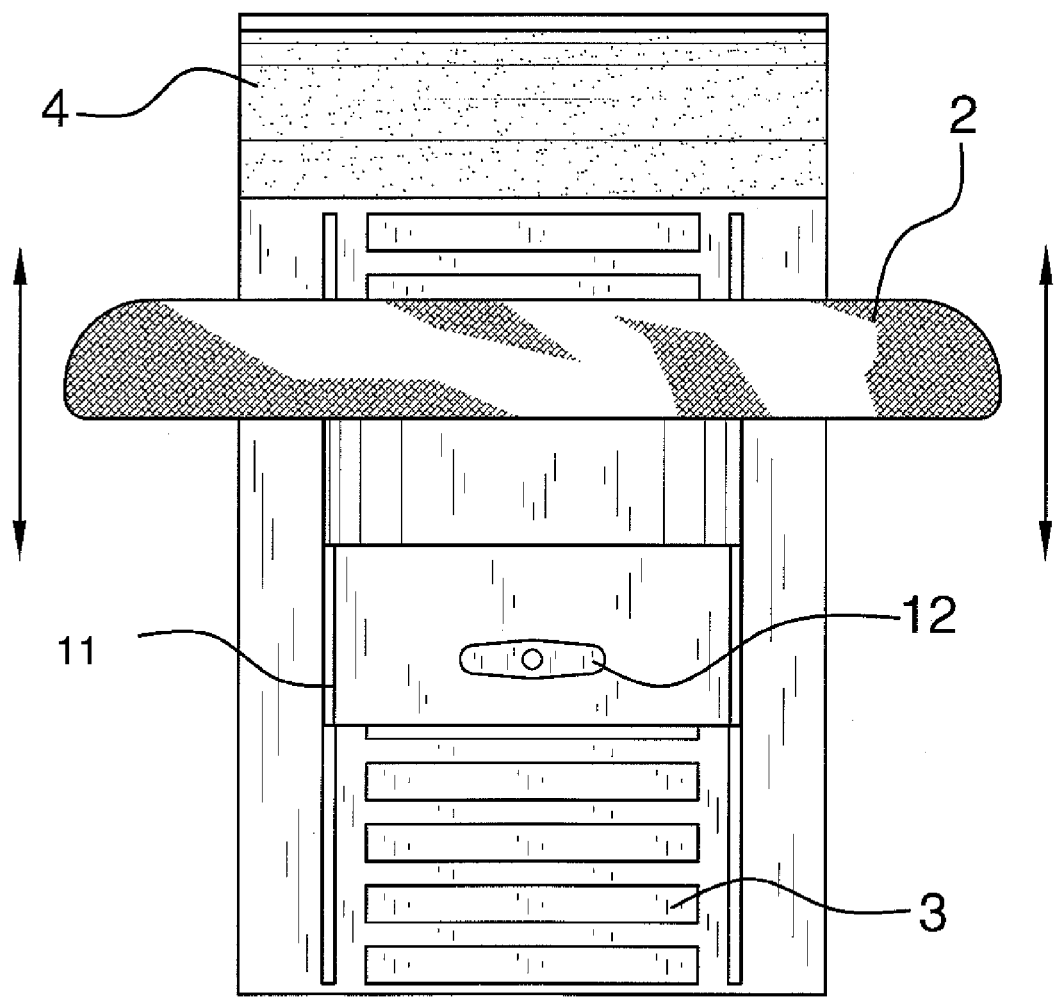
FIG. 5 illustrates vertical movement on the proximal side of an adjustable arm rest having a track and spring biased lever.

To secure arm rest 1, flexible grip 4 can be extended from the distal side of body 8 and adapted to fit between slidable window 9 and door panel 10 on a vehicle as is shown in FIG. 4. Flexible grip 4 can be composed of separately joined parts and pivotally joined by a pivot 5 or, comprising a unitary piece of flexible material. Materials for creating flexible grip 4 can be made of sturdy fabric, plastic, rubber, vinyl, silicon or other flexible materials.

It is preferred that on the side of grip 4 facing door panel 10 are one or more tooth-like structures 7 preferably made of rubber for providing proper traction against door panel 10. Grip 4 will prevent arm rest 1 apparatus from sliding with window 9 when it is rolled up or down as a result of traction created by teeth 7. Alternatively, teeth 7 can be placed on the opposing side, facing the window so that grip 4.

In another exemplary embodiment, removable covers can be provided as an accessory to fit over pad 2 of arm rest 1. The material of the removable covers may comprise any flexible materials but preferably made of cloth and fitted over pad 2 with an elastic gather. The use of removable covers enables pad 2 to remain free from dirt and debris and also be distributed as an accessory in a variety of colors and/or designs to match the preferences of the vehicle owner.

Materials for the base and support can be made of moldable plastic, rubber, or other synthetic materials.

Although several embodiments have been described, the same should not be construed as limited thereby to specific features mentioned herein, but include various other equivalent features and should only be limited in accordance with the claims appended hereto. It is understood that any suitable changes or substitutions may be made without departing from the spirit and scope of the invention.

I claim:

1. An adjustable vehicle armrest comprising:
   a body possessing a distal end and a proximal end;
   said proximal end comprising a track having a plurality of apertures vertically aligned;
   an adjustable arm rest portion slidably engaging said proximal end of said body;
   a flexible attachment portion coupled to said body and adapted to securely engage a vehicle door; and
   said arm rest portion slidably engages said track through a spring lever biased against said arm rest portion and said body to lock the arm rest portion into a desired vertical position when aligned with a desired aperture on said track.

2. The adjustable vehicle armrest of claim 1 wherein said flexible attachment portion further comprises a first end flexibly joined to said body and a serrated second end adapted to fit between a vehicle window and door panel.

3. The adjustable vehicle armrest of claim 1 wherein said arm rest portion encases a fluid portion and operatively engages said body.

\* \* \* \* \*